United States Patent
Grover et al.

(10) Patent No.: US 12,206,771 B2
(45) Date of Patent: Jan. 21, 2025

(54) SYSTEM AND METHOD FOR MANAGING FRAGMENTED ENCRYPTION KEYS FOR GRANTING ACCESS

(71) Applicant: MICRO FOCUS LLC, Santa Clara, CA (US)

(72) Inventors: Douglas Max Grover, Rigby, ID (US); Michael F. Angelo, Houston, TX (US); Martin Fraser Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 281 days.

(21) Appl. No.: 17/853,756

(22) Filed: Jun. 29, 2022

(65) Prior Publication Data
US 2024/0007279 A1 Jan. 4, 2024

(51) Int. Cl.
*H04L 9/08* (2006.01)
*G06F 21/60* (2013.01)
*H04L 9/32* (2006.01)

(52) U.S. Cl.
CPC .......... *H04L 9/0861* (2013.01); *G06F 21/602* (2013.01); *G06F 21/606* (2013.01); *H04L 9/32* (2013.01)

(58) Field of Classification Search
CPC ................................. H04L 9/50; G06F 21/606
See application file for complete search history.

(56) References Cited

U.S. PATENT DOCUMENTS

| | | |
|---|---|---|
| 5,276,737 A | 1/1994 | Micali |
| 5,315,658 A | 5/1994 | Micali |
| 6,026,163 A | 2/2000 | Micali |
| 8,917,872 B2 | 12/2014 | Li |
| 9,165,158 B2 | 10/2015 | Li |
| 11,281,813 B1 | 3/2022 | Morgan |
| 2004/0101142 A1* | 5/2004 | Nasypny ............... G06F 21/606 380/278 |
| 2023/0370275 A1* | 11/2023 | Aspler-Yaskil ........... H04L 9/50 |

FOREIGN PATENT DOCUMENTS

WO    WO-2016190476 A1    12/2016

OTHER PUBLICATIONS

Silvio Macali; Fair Public-Key Cryptosystems; Laboratory for Computer Science, Massachusetts Institute of Technology; 1993; 26 pages.

* cited by examiner

*Primary Examiner* — Barbara B Anyan
(74) *Attorney, Agent, or Firm* — Sheridan Ross P.C.

(57) ABSTRACT

A secondary fragment of an encryption key is received. The secondary fragment is associated with an authentication process of a user. The secondary fragment is one of a plurality of secondary fragments of the encryption key. The user is authenticated (e.g., by validating a username/password). The encryption key is regenerated using the secondary fragment and a primary fragment of the encryption key. In response to regenerating the encryption key using the secondary fragment and the primary fragment, and authenticating the user: access is granted, to the user, by unencrypting an encrypted data record using the regenerated encryption key.

20 Claims, 10 Drawing Sheets

| Key Management Table 400 / 201 | | |
|---|---|---|
| Record Name | Encryption Method 401 | Type |
| User Name | None -- Plaintext | N/A ← Public Access |
| Address | 64-Bit Encryption | AES ← User A (64-Bit Key) |
| Healthcare Data | Split-Key Encryption | Primary Frag (103A1 of 3) ← Secondary Frag (103A2) User 104A / Secondary Frag (103A3) User 104B |

SYSTEM AND METHOD FOR MANAGING FRAGMENTED ENCRYPTION KEYS FOR GRANTING ACCESS

FIELD

The disclosure relates generally to data encryption and particularly to providing controlled access to encrypted data using fragmented encryption keys.

BACKGROUND

One of the problems with storing data is that the data may be subject to the laws of various jurisdictions. For example, the data may require access control/management based on the General Data Protection Regulation (GDPR), the California Consumer Privacy Act (CCPA), the Health Insurance Portability and Accountability Act of 1996 (HIPAA) and/or the like. To comply with these laws, access may need to be revoked based on the legal requirements of the various laws. Existing systems are currently difficult to administer and manage records associated with these types of laws.

SUMMARY

These and other needs are addressed by the various embodiments and configurations of the present disclosure. The present disclosure can provide a number of advantages depending on the particular configuration. These and other advantages will be apparent from the disclosure contained herein.

A secondary fragment of an encryption key is received. The secondary fragment is associated with an authentication process of a user. The secondary fragment is one of a plurality of secondary fragments of the encryption key. The user is authenticated (e.g., by validating a username/password). The encryption key is regenerated using the secondary fragment and a primary fragment of the encryption key. In response to regenerating the encryption key using the secondary fragment and the primary fragment, and authenticating the user: access is granted, to the user, by unencrypting an encrypted data record using the regenerated encryption key.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 4 is a key management table used in a mixed environment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
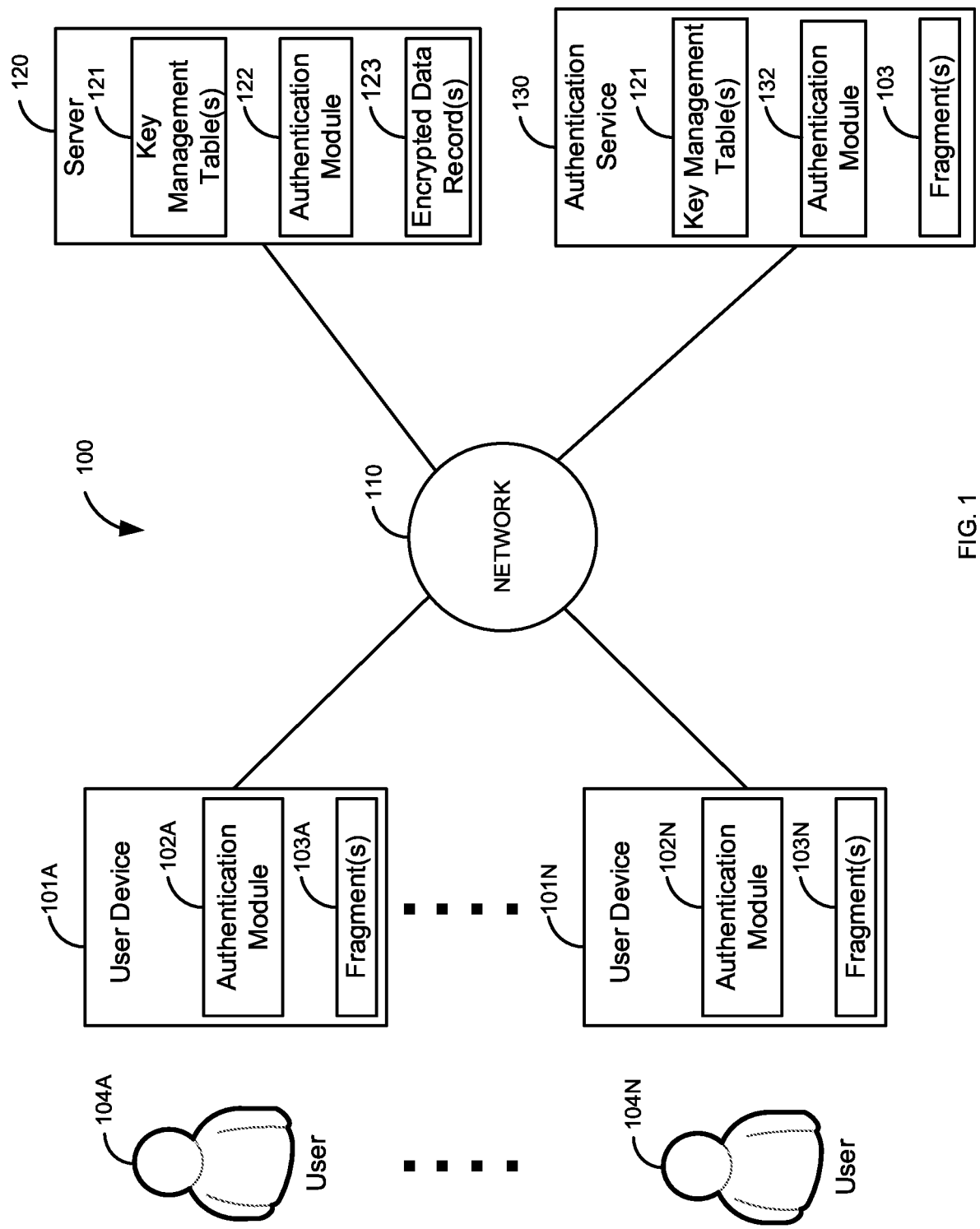
FIG. 1 is a block diagram of a first illustrative system for managing fragmented encryption keys.

FIG. 1 is a block diagram of a first illustrative system 100 for managing fragmented encryption keys. The first illustrative system 100 comprises user devices 101A-101N, a network 110, a server 120, and an authentication service 130.

The user devices 101A-101N can be or may include any user communication device that can communicate on the network 110, such as a Personal Computer (PC), a telephone, a video system, a cellular telephone, a Personal Digital Assistant (PDA), a tablet device, a notebook device, a web server, a media server, a smartphone, a server 120, and/or the like. Each user device 101A-101N has a corresponding user 104A-104N.

The user devices 101A-101N further comprise authentication modules 102A-102N and fragments 103A-103N. The authentication modules 102A-102N are used to provide authentication services for the users 104A-104N. The authentication modules 102A-102N may use a variety of authentication factors, such as, a username/password, a Short Message Service (SMS) code, an email code, an instant messaging code, a fingerprint scan, a facial print scan, an iris scan, a voiceprint, security questions, a digital certificate, and/or the like.

The fragments 103A-103N are used to authenticate the users 104A-104N. The fragments 103A-103N are generated using any split-key encryption process, such as, Micali encryption (see Fair Public-Key Cryptosystems, Silvio Micali, 1993 Laboratory for Computer Science, Massachusetts Institute of Technology, 545 Technology Square, Cambridge MA 02139, Multiparty Computation (see http://www/hypr.com/key-splitting/#:~:text=Splitting%2C%20or%20key%20splitting%2C%20is.part%20is%20inte rcepted%20and%20analyzed), and/or the like. Each of these references are incorporated herein by reference.

In one embodiment, the fragments 103A-103N may not be stored on the user devices 101A-101N. In this embodiment, the fragments 103 are stored in the authentication service 130.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be any device that is used to manage any encrypted data record(s) 123, such as a database server, a web server, a security server, a file system, an embedded device, a personal computer, and/or the like. The server 120 comprises key management table(s) 121, an authentication module 122, and encrypted data record(s) 123.

The key management table(s) 121 are tables that are used to associate the encrypted data records 123 with primary and secondary fragments (103). Examples of key management table(s) 121 are further described in FIGS. 2-4. The key management table(s) 121 are stored in a memory that is persistent (e.g., stored on a hard disk). In one embodiment, server 120 may not comprise the key management table(s) 121. In this embodiment, the key management table(s) 121 are stored in the authentication service 130 (e.g., in a memory).

The authentication module 122 is used to authenticate the user 104 in order to access the encrypted data records 123. In one embodiment, the authentication module 122 works in conjunction with the authentication service 130 to provide access to the encrypted data record(s) 123.

The encrypted data record(s) 123 may comprise any data/information that is encrypted. For example, the encrypted data record(s) 123 may comprise encrypted database records, encrypted files, encrypted data (e.g., an encrypted application), encrypted emails, encrypted documents, encrypted text messages, encrypted voicemails, encrypted videos, and/or the like. An encrypted data record 123 may comprise a group of records. For example, an encrypted data record 123 may comprise a database table that comprises multiple records that are encrypted using the same encryption key. The encrypted data records 123 may be used by an application, such as, a financial application, network management application, a security application, a database application, a web application, and/or the like.

The authentication service 130 can be or may include any hardware coupled with hardware that can authenticate the users 104A-104N, such as, a security server, a third-party authentication service, an internal authentication service, a directory service, and/or the like. The authentication service 130 further comprises key management table(s) 121, an authentication module 132, and fragments 103. As discussed above the key management table(s) 121 may reside in the server 120 and/or the authentication service 130.

The authentication module 132 works in conjunction with the authentication modules 102A-102N to authenticate the users 104A-104N. The authentication module 132 may use any authentication factors, such as, a username/password, a SMS code, an email code, a chat code, a biometric, a security questions(s), digital certificates, and/or the like.

The fragments 103, as discussed above, may reside on the authentication service 130 and/or may reside in the user devices 101A-101N. The fragments 103 are used as part of the authentication process for granting access to the encrypted data record(s) 123.

In one embodiment, the authentication service 130 may be part of the server 120. This embodiment is described in more detail in FIG. 9.

Figure 2:
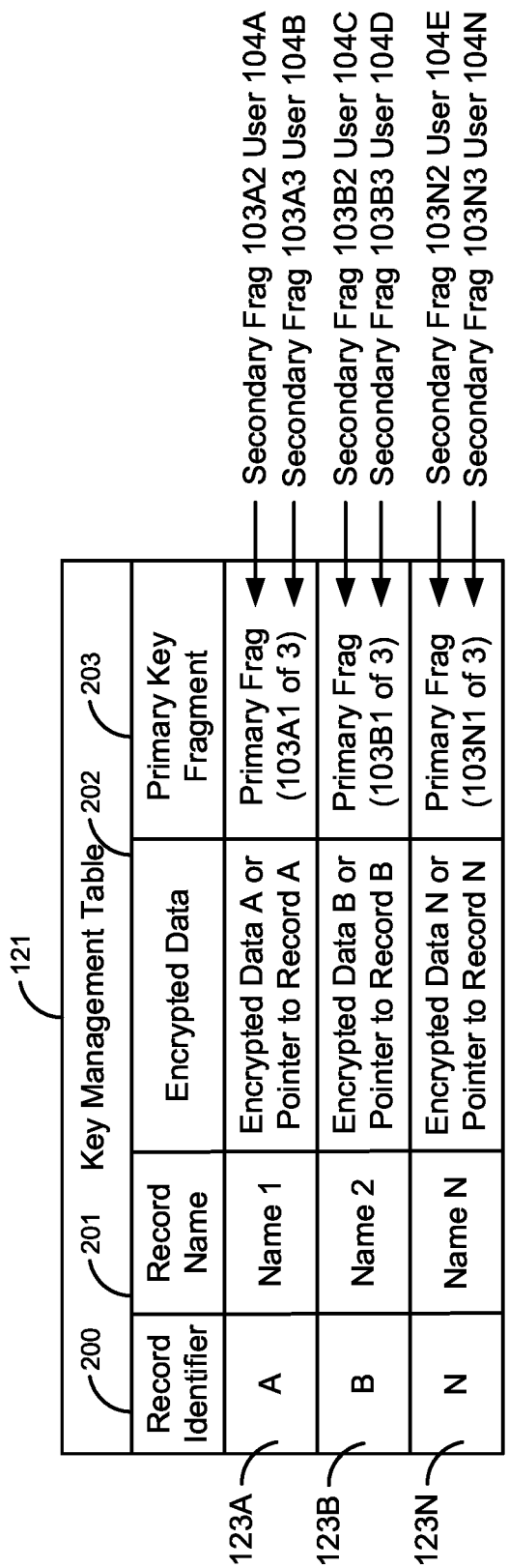
FIG. 2 is a key management table where fragments are used to grant user access to encrypted data records.

FIG. 2 is an exemplary key management table 121 where fragments 103 are used to grant user access to the encrypted data records 123. The process uses split-key encryption as a way to provide individualized access to the encrypted data records 123. The key management table 121 comprises a record identifier column 200, a record name column 201, an encrypted data column 202, and a primary fragment column 203. The key management table 121 comprises encrypted data records 123A-123N. Each encrypted record 123A-123N comprises a record identifier, a record name, encrypted data (or a pointer to the encrypted data), and a primary fragment 103. The columns 200-203 may vary based on implementation. An encrypted data record 123 may be for a single record, may be for multiple record types (e.g., for all usernames in a database), for a group of data (e.g., a table in a database), for an application, and/or the like. As described herein and in the claims, the encrypted data record 123 includes any encrypted data that is pointed to by a pointer in the encrypted data column 202.

The primary fragment (e.g., 103A1) in the key management table 121 is a fragment of a split-key encryption key. The primary fragment 103 typically is a longer fragment 103 or may comprises multiple fragments 103. Split-key encryption is an encryption process where an encryption key is divided into multiple fragments. Based on having a minimum number of fragments 103, the original split-key encryption key can be regenerated. Regeneration of the split-key encryption key typically requires a majority of the total number of fragments 103. In FIG. 2, each split-key encryption key for each of the encrypted data records 123A-123N has been fragmented into three fragments 103.

For example, for the encrypted data record 123A, the primary fragment 103A1 is in the key management table 121. Likewise, the primary fragments 103B1 and 103N1 (for different keys) are in the key management table 121 in encrypted data records 123B-123N. In this example, user 104A is given the secondary fragment 103A2 and user 104B is given the secondary fragment 103A3. This allows user 104A to regenerate the split-key encryption key A using the primary fragment 103A1 and the secondary fragment 103A2. User 104B can regenerate the split-key encryption key A using the primary fragment 103A1 and the secondary fragment 103A3. This allows both user 104A and user 104B to be able to unencrypt the encrypted data record 123A where user 104A and user 104B have different secondary fragments 103A2/103A3. As shown in FIG. 2, the users 104B-104N can access the encrypted data records 123B-123N in a similar manner.

In one embodiment, the primary fragment (e.g., 103A1) may comprise more than one fragment 103. For example, the split key encryption key for encrypted data record 123A may be fragmented into nine fragments 103 where the primary fragment 103A1 comprises four fragments 103. This leaves five secondary fragments 103 available to five different users 104.

In another embodiment, there are nine fragments 103 where the primary fragment 103A1 comprises five fragments 103. This leaves four secondary fragments 103 available to four different users 104.

In another embodiment, there are nine fragments 103 where the primary fragment 103A1 comprises three fragments 103. This leaves six secondary fragments 103 available to six different users 104 (assuming that all the six fragments are used). In this embodiment, at least two different fragments 103 from at least two different users 104 are needed to regenerate the original encryption key when combined with the primary fragment 103A1. For example, an administrator and a user may be necessary to regenerate the original encryption key. Another example may be where the fragments 103 are stored in multiple servers (e.g., at two data centers). This would make it more difficult for a hacker to access the encrypted data record 123.

By allowing access using different fragments 103, compliance with the regulations or information controls (e.g., GDPR/CCPA/HIPAA) can be met. For example, if the encrypted data record 123A is a user's healthcare record, if the user 104A (e.g., healthcare provider A) no longer needs access under the GDPR/CCPA/HIPAA, the fragment 103A2 can be permanently deleted while the user 104B (e.g., the user 104B of the healthcare record) will still have access to the encrypted data record 123A. If a different user 104 (e.g., healthcare provider 104F) now needs access, the user 104F can be provided a different fragment 103 or can be provided the fragment 103A2. If both the user 104A and the user 104B no longer need access, or the data owner revokes access, fragment 103A1 can be permanently deleted from the key management table 121. In this embodiment, the users 104A/104B do not have direct access to the primary fragment 103A1. Thus, the user 104A and the user 104B will only have a single fragment 103A2/103A3 and will no longer be able to unencrypt the encrypted data record 123A. Using the example above where there are nine fragments 103 where the primary fragment 103A1 comprises five fragments, even if a user 104 happened to obtain all of the four secondary fragments 103 (or the owners of the four secondary fragments 103 colluded together), the original encryption key could still not be regenerated because five fragments 103 are necessary to regenerate the original encryption key. Another option would be where the primary fragment 103A1 comprises four fragments and one of the five secondary fragments 103 is permanently deleted or not provided to a user 104. In this embodiment, even if a malicious party (e.g., among the users 104) could gain access to all four secondary fragments 103, the malicious party could not regenerate the original encryption key.

In another embodiment, regeneration of the encryption key by multiple users 104 may be a requirement. For example, if there were seven fragments 103 and the primary fragment 103 comprises two fragments 103, at least two users 104 with two secondary fragments would be needed be able to regenerate the encryption key to access the encrypted data record 123.

In another embodiment, access to the encrypted data record 123 may require multiple users 104 (e.g., two of three users 104) to regenerate the encryption key. For example, there may be three fragments 103 (no primary fragments 103) where it takes at least two users 104 to obtain access using the at least two of the secondary fragments 103.

Figure 3:
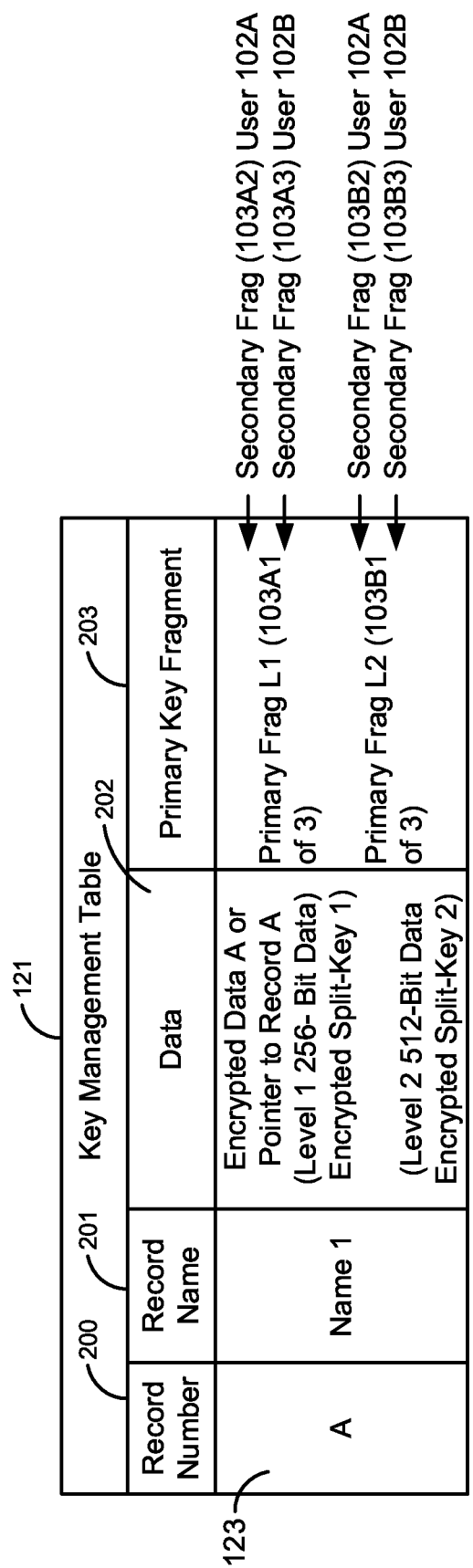
FIG. 3 is a key management table where fragments are used to grant access to encrypted data records based on authentication levels.

FIG. 3 is a key management table 121 where the fragments 103 are used to grant access to the encrypted data records 123 based on authentication levels. In FIG. 3, there is a single exemplary encrypted data record 123 where there are two split-key encryption keys associated with different authentication levels for the same encrypted data record 123. Although shown as a single encrypted data record 123, the encrypted data record 123 could be split into two separate encrypted data records 123 based on each authentication level. In FIG. 3, there is a 256-bit split-key encryption key associated with level one authentication (e.g., a username/password) and a 512-bit split-key encryption key associated with level two authentication (e.g., username/password/fingerprint scan). The encrypted data record 123 has data that has been encrypted (and/or points to data that has been encrypted) using the two split-key encryption keys. Here, the user 104A can unencrypt the level one encrypted data record 123 using secondary fragment 103A2 (after being authenticated at level one) and can unencrypt the level two encrypted data record 123 using the secondary fragment 103B2 (after being authenticated at level two). Likewise, the user 104B can unencrypt the level one encrypted data record 123 using the secondary fragment 103A3 (after being authenticated at level one) and can unencrypt the level two encrypted data record 123 using the secondary fragment 103B3 (after being authenticated at level two). The split-key encryption key for each authentication level may use different size keys, may be the same size encryption keys, may use different encryption algorithms, and/or the like.

The same process for permanent deletion of fragments 103 may be used for the encrypted data record(s) 123 of FIG. 3. For example, access to the level one encrypted data record 123 for user 104A may be removed by permanently deleting the secondary fragment 103A2. This can be accomplished in various ways, such as, deleting the secondary fragment 103A2 on the user device 101, deleting the secondary fragment 103A2 on the authentication service 130, revoking the secondary fragment 103A2 as described in FIG. 10, and/or the like. Access to the level one encrypted data record 123 for both user 104A and user 104B may be removed by permanently deleting the primary fragment 103A1 from the key management table 121 (assuming that the primary fragment 103A1 is large enough (e.g., comprises enough fragments) that the two secondary fragments 103A2/103A3 cannot be combined to regenerate the original encryption key). A similar process may be used for the level two encrypted data record 123.

In one embodiment, if the user 104A authenticates at level two, the user 104A will get both fragments 103A2/103B2. Alternatively, the requirement may be that access with an authentication level will only provide the specific fragment 103 associated with the authentication level.

The process of FIG. 3 may apply where a different user(s) 104 have level two access versus the users 104 who have level one access (e.g., role-based access). For example, users 104C/104D may have access to the fragments 103B2/103B3 instead of the users 104A/104B.

The process of FIG. 3 could apply to more than just two authentication levels (e.g., there could be three authentication levels). Moreover, the authentication factors for the levels may use various kinds of authentication factors, such as, username/password, SMS codes, email codes, one-time-passwords, biometrics, digital certificates, security questions, and/or the like. The authentication factors may vary based on the user 104 and/or the location of the user 104. For example, level two authentication may only require a username/password if the user 104 is located on the corporate network 110 and a username/password/SMS if the user is outside the corporate network 110. In one embodiment, there may be multiple users 104 associated with a single fragment 103. For example, fragment 103B3 may be associated with user 104B and user 104C.

The size of the fragments 103 may be different. For example, the fragments 103A1-103A3 may be different sizes. In one embodiment, the primary fragments (e.g., 103A1/103B1) may comprise multiple fragments 103. The number of fragments 103/users 104 may be different from the three fragments 103/two users 104 described in FIG. 3. For example, there may be seven fragments 103 where three users 104 each have two fragments 103. In this example, the primary fragment 103 in the key management table 121 may be larger than the fragments 103 controlled by the users 104. In one embodiment, a user 104 may have a different size fragment 103 than another user 104 or have more/less fragments 103 than another user 104.

FIG. 4 is a key management table 121 used in a mixed environment. The key management table 121 of FIG. 4 comprises the record name column 201, an encryption method column 400, and a type column 401. The key management table 121 also comprises a plaintext record 402, a non-fragmented key encrypted data record 403, and an encrypted data record 123.

In FIG. 4 the plaintext record 402 comprises data that is not encrypted. Typically, the plaintext record 402 may be a public record (but does not have to be public). The non-fragmented key encrypted data record 403 is a record that has been encrypted using a traditional encryption process that does not use split-key encryption keys. The non-fragmented key encrypted data record 403, in this example, uses Advanced Encryption Standard (AES) at an appropriate key length. The encrypted data record 123 is similar to the encrypted data records 123 described in FIG. 2.

Although not shown, the key management table 121 of FIG. 4 may include an encrypted data record 123 like described in FIG. 3 that uses authentication levels. In FIG. 4, the primary fragment 103A1 along with the encryption key for the AES algorithm may be provided based on authentication levels. For example, for level one authentication for user 104A (e.g., a username/password) may provide the AES key and level two access may provide the primary fragment 103A1 (and optionally the AES key).

Figure 5:
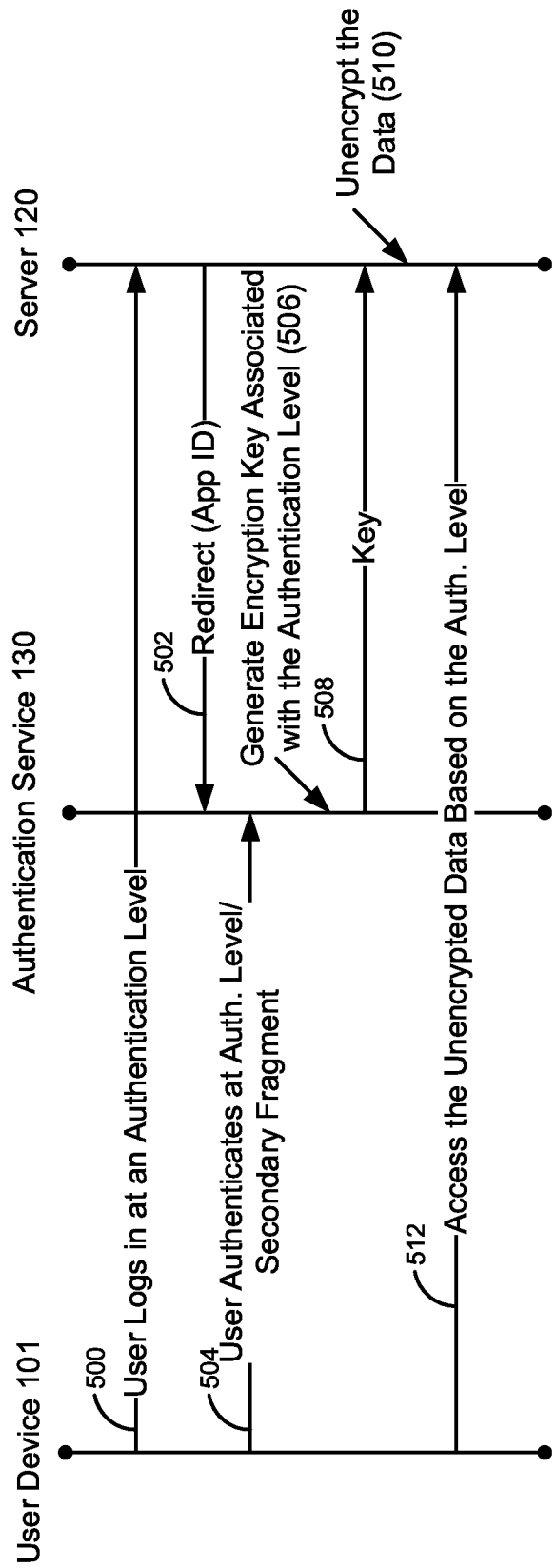
FIG. 5 is a flow diagram of a process of a first embodiment for granting access based on fragmented encryption keys.

FIG. 5 is a flow diagram of a process of a first embodiment for granting access based on fragmented encryption keys. Illustratively, the user devices 101A-101N, the authentication modules 102A-102N, the server 120, the authentication module 122, the authentication service 130, and the authentication module 132 are stored-program-controlled entities, such as a computer or microprocessor, which performs the method of FIGS. 5-10 and the processes described herein by executing program instructions stored in a computer readable storage medium, such as a memory (i.e., a computer memory, a hard disk, and/or the like). Although the methods described in FIGS. 5-10 are shown in a specific order, one of skill in the art would recognize that the steps in FIGS. 5-10 may be implemented in different orders and/or be implemented in a multi-threaded environment. Moreover, various steps may be omitted or added based on implementation.

The process starts, in step 500, when the user 104 tries to login to the server 120 to access the encrypted data record(s) 123. The user 104 is redirected to the authentication service 130 in step 502. The message of step 502 may also include an application identifier of an application on the server 120 that needs access to the encrypted data record(s) 123. The user 104 then authenticates at an authentication level in step 504. For example, the user 104 authenticates at level two using two authentication factors. In one embodiment, there may only be a single authentication level. As part of the authentication process of step 504, the user device 101 provides the secondary fragment 103 owned by the user 104. In response to providing the proper authentication factors and the secondary fragment 103 in step 504, the authentication service 130 generates, in step 506, the encryption key using the primary fragment 103 in the key management table 121. The authentication service 103 sends the generated encryption key to the server 120 in step 508. Step 508 may also include a user credential based on the authentication level. Based on the received encryption key, the server 120 decrypts the encrypted data record 123 in step 510. The user 104 can then access the decrypted data record 123 in step 512.

The process of FIG. 5 may be used to generate multiple encryption keys. For example, the user 104 may provide multiple fragments 103 in step 504 to access multiple encrypted data records 123.

Figure 6:
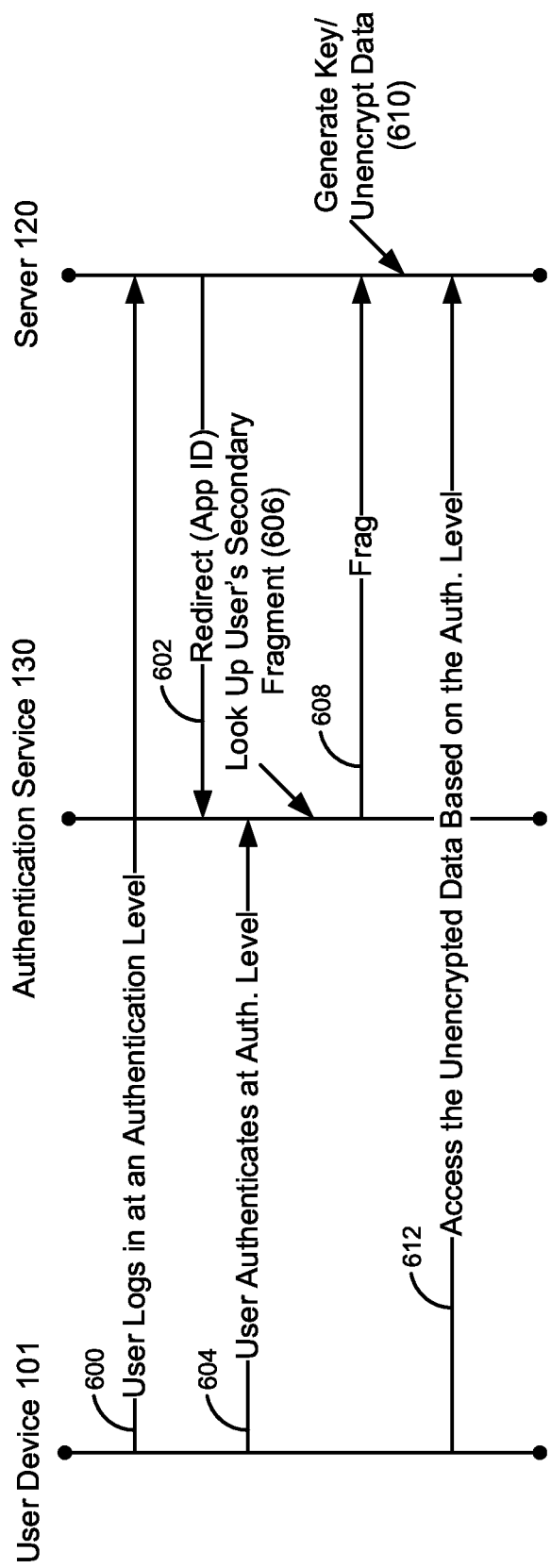
FIG. 6 is a flow diagram of a process of a second embodiment for granting access based on fragmented encryption keys.

FIG. 6 is a flow diagram of a process of a second embodiment for granting access based on fragmented encryption keys. The process starts, in step 600, when the user 104 tries to authenticate to the server 120 to access the encrypted data record(s) 123 using an authentication level (may be one or more authentication levels). The user 104 is redirected to the authentication service 130 in step 602. The message of step 602 may also include an application identifier of an application on the server 120 that needs access to the encrypted data record(s) 123. The user 104 then authenticates at an authentication level in step 604 (may be one or more authentication levels). In this embodiment, based on the user 104 providing the proper authentication factor(s) in step 604, the authentication service 130 looks up the user's secondary fragment 103, in step 606, and then provides the secondary fragment 103 in step 608 to the server 120. Step 608 may also include a user credential based on the authentication level. In this embodiment, the key management table 121 is stored on the server 120. Upon receiving the secondary fragment 103 from the authentication service 120, in step 608, the server 120 generates, in step 610, the encryption key using the received secondary fragment 103 and the primary fragment 103 stored in the key management table 121 on the server 120. This allows the user 104 to access/unencrypt the encrypted data record 123 in step 612.

The process of FIG. 6 may be used to generate multiple encryption keys. For example, the authentication service 130 may provide multiple fragments 103 in step 608 to access multiple encrypted data records 123.

Figure 7:
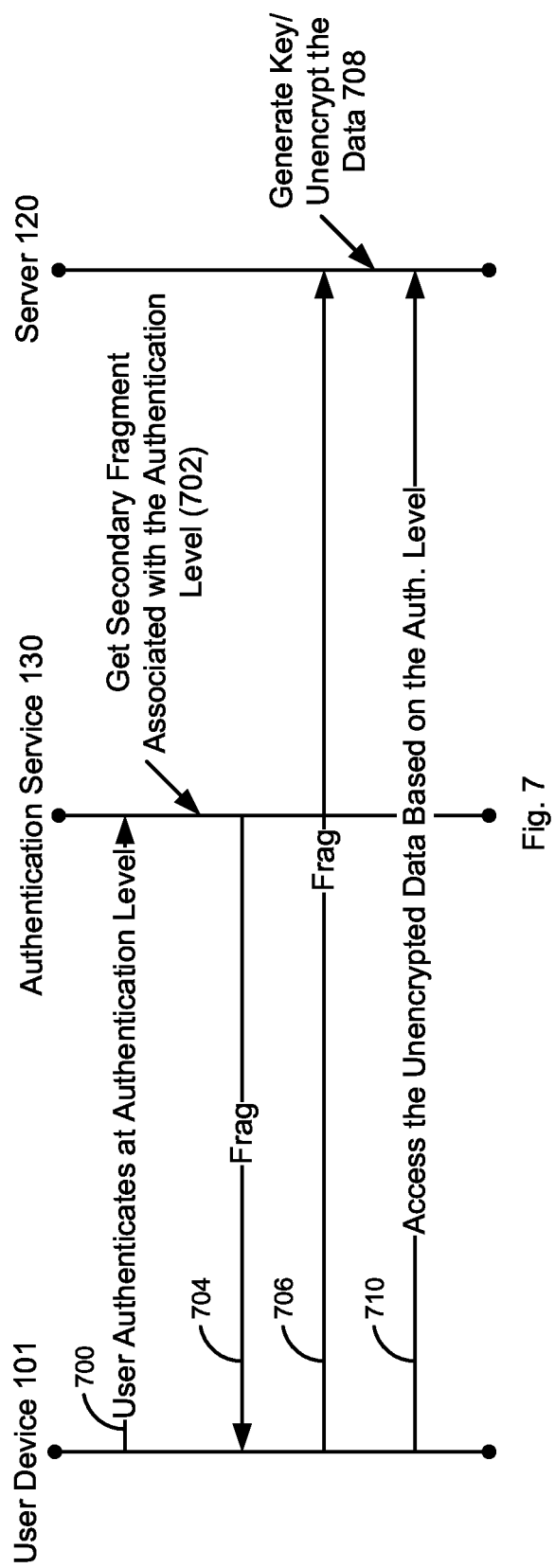
FIG. 7 is a flow diagram of a process of a third embodiment for granting access based on fragmented encryption keys.

FIG. 7 is a flow diagram of a process of a third embodiment for granting access based on fragmented encryption keys. The process starts in step 700 where the user 104 authenticates at an authentication level directly with the authentication service 130. The authentication may comprise one or more authentication levels. The authentication service 130 gets the user's secondary fragment 103 associated with the authentication level in step 702. The authentication service 130 sends the user's secondary fragment 103, in step 704, to the user device 101. Step 704 may also include a user credential based on the authentication level. The user device 101 sends the secondary fragment 103 (and the credential if there is one), in step 706, to the server 120. The server 120 generates the encryption key using the secondary fragment 103 and the primary fragment 103 in the key management table 121 and unencrypts the encrypted data record 123 in step 708. The server 120 then grants access to the unencrypted data record(s) 123 in step 710.

The process of FIG. 7 may be used to generate multiple encryption keys. For example, the authentication service 130 may provide multiple fragments 103 in step 704. The fragments 103 may then be used to generate multiple encryption keys to access multiple data encryption records 123.

Figure 8:
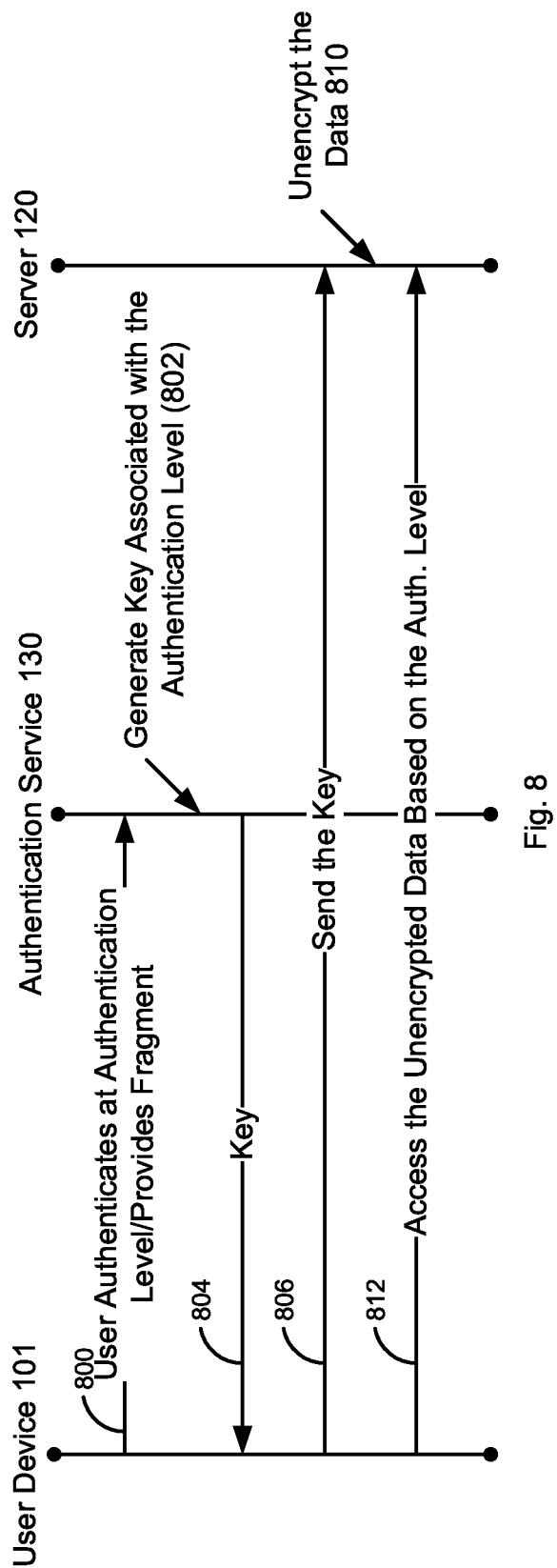
FIG. 8 is a flow diagram of a process of a fourth embodiment for granting access based on fragmented encryption keys.

FIG. 8 is a flow diagram of a process of a fourth embodiment for granting access based on fragmented encryption keys. The process starts in step 800 where the user 104 authenticates at an authentication level (may be one or more authentication levels). Step 800 also includes the user's secondary fragment 103. The authentication service 103 generates, in step 802, the encryption key using the secondary fragment 103 provided in step 800 and the primary fragment 103 in the key management table 121 stored in the authentication service 130. The authentication service 130 sends the generated encryption key, in step 804, to the user device 101. The user device 101 sends the encryption key, in step 806, to the server 120. The server 120 unencrypts the encrypted data record 123 in step 810. The user 104 can the access the unencrypted data record 123 in step 812.

In one embodiment, instead of sending the encryption key to the server 120, the user device 101 receives the encrypted data record 123 and unencrypts the encrypted data record 123 at the user device 101.

The process of FIG. 8 may be used to generate multiple encryption keys. For example, the user 104 may provide multiple fragments 103 in step 800. The fragments 103 may then be used to generate multiple encryption keys to access multiple data encryption records 123 in step 802.

Figure 9:
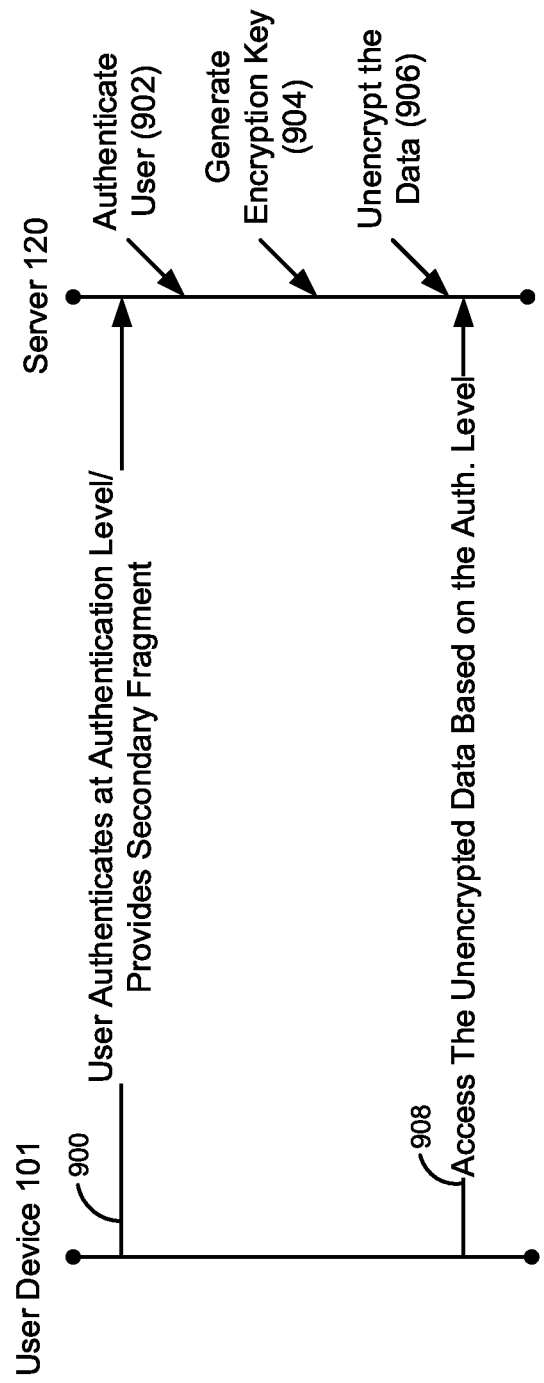
FIG. 9 is a flow diagram of a process of a fifth embodiment for granting access based on fragmented encryption keys.

FIG. 9 is a flow diagram of a process of a fifth embodiment for granting access based on fragmented encryption keys. The process starts, in step 900, when the user 104 authenticates at an authentication level (may be one or more authentication levels). The message of step 900 includes the user's secondary fragment 103. The server 120 authenticates the user 104 in step 902. In response to authenticating the user 104 in step 902, the server 120 generates the encryption key using the user's secondary fragment 103 and the primary fragment 103 stored in the key management table 121 stored on the server 120. The server 120 unencrypts the encrypted data record 123 in step 906. The user 104 can then access the unencrypted data record 123 in step 908.

Figure 10:
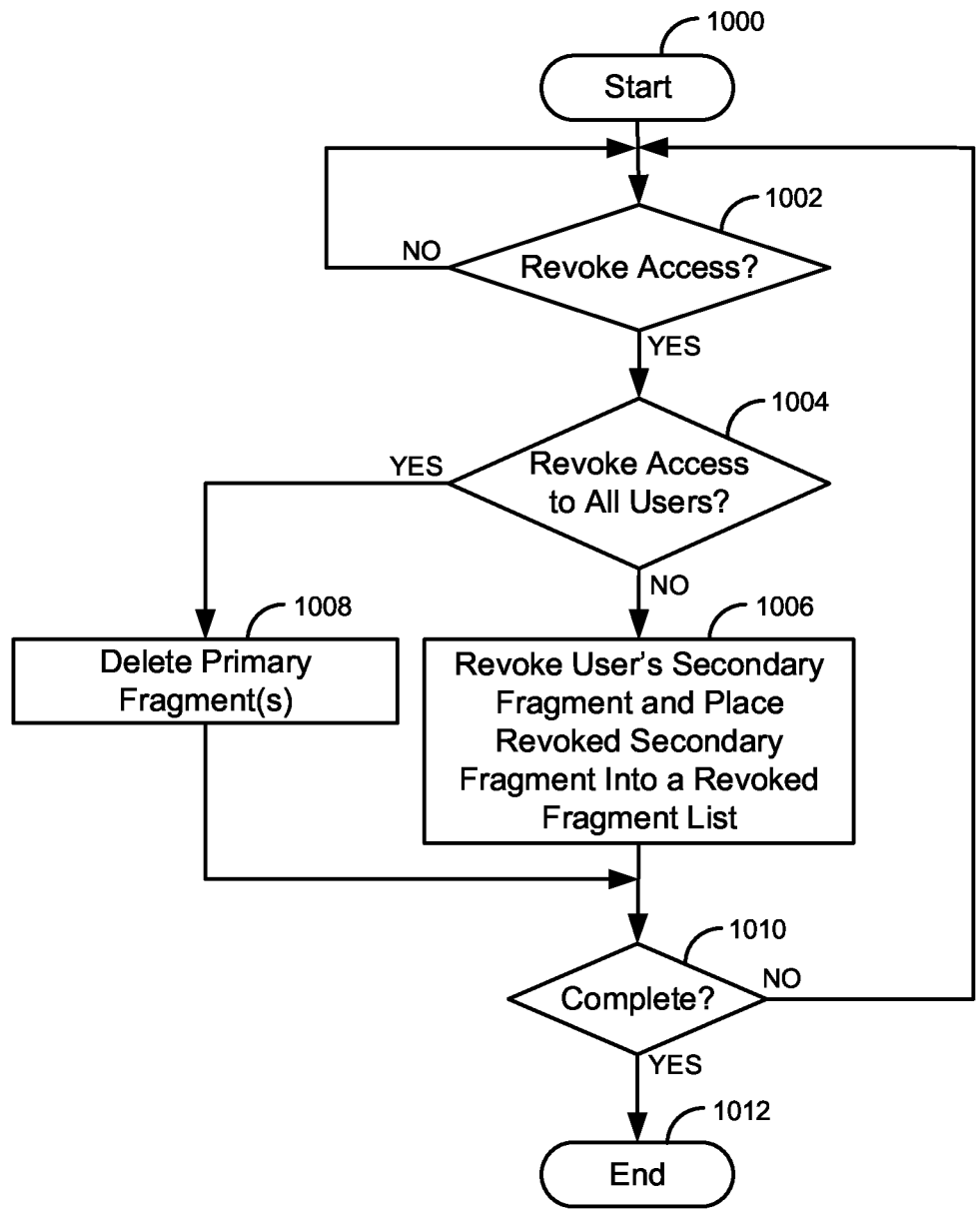
FIG. 10 is a flow diagram of a process for revoking fragments.

FIG. 10 is a flow diagram of a process for revoking fragments 103. The process starts in step 1000. The process determines, in step 1002, if a request to revoke access to a fragment 103 has been received. A request to revoke access may be generated in various ways, such as, based on an administration, based on a time period, based on an event (e.g., a user 104 leaving a company), and/or the like. If a request to revoke access has not been received in step 1002, the process of step 1002 repeats.

Otherwise, if a request to revoke access is received in step 1002, the process determines, in step 1004, if the request is to revoke access is for all the users 104. For example, the request to revoke access may be for all the users 104 that use the primary fragment 103A1 of FIG. 2 (users 104A and 104B). If the request to revoke access is for all users 104, the process deletes the primary fragment(s) (e.g., primary fragment 103A1) step 1008. The process then goes to step 1010.

Otherwise, if the request to revoke access is for a specific user(s) 104 in step 1004, the process revokes the user's secondary fragment 103 and places the revoked secondary fragment 103 in a revoked fragment list. The revoked fragment list is used to reject any attempts to use the revoked fragment 103. For example, if the fragment 103A2 of FIG. 2 is revoked and added to the revoked fragment list, even if the user 104A tries to access the encrypted data record 123A, the user 104A would no longer be able access/unencrypt the encrypted data record 123A. In one embodiment, revoking the fragment 103 may be to permanently delete the secondary fragment 103.

The process determines, in step 1010, if the process is complete. If the process is not complete in step 1010, the process goes back to step 1002. Otherwise, if the process is complete, in step 1010, the process ends in step 1012.

The use of encryption/fragments 103 described herein are designed to prevent unauthorized access to the encrypted data record 123. In order to do so, the encryption algorithms described herein cannot be attacked/broken using manual processes. In reality, a user 104 or a number of users 104 would not be able to unencrypt the encrypted data record 123 without the assistance of a large amount of computing power.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
    a microprocessor; and
    a computer readable medium, coupled with the microprocessor and comprising microprocessor readable and executable instructions that, when executed by the microprocessor, cause the microprocessor to:
        receive a first secondary fragment of a first encryption key, wherein the first secondary fragment is associated with an authentication process of a first user and wherein the first secondary fragment is one of a plurality of secondary fragments of the first encryption key;
        authenticate the first user;
        regenerate the first encryption key using the first secondary fragment and a first primary fragment of the first encryption key;
        in response to regenerating the first encryption key using the first secondary fragment and the first primary fragment, and authenticating the first user: grant access, by the first user, by unencrypting a first encrypted data record using the regenerated first encryption key; and
        revoke the first secondary fragment, wherein revoking the first secondary fragment comprises adding the first secondary fragment to a revoked fragment list associated with the first encryption key.

2. The system of claim 1, wherein the microprocessor readable and executable instructions further cause the microprocessor to:
    receive a second secondary fragment of the first encryption key, wherein the second secondary fragment is associated with an authentication process of a second user and wherein the second secondary fragment is one of the plurality of secondary fragments of the first encryption key;
    authenticate the second user;
    regenerate the first encryption key using the second secondary fragment of the first encryption key and the first primary fragment of the first encryption key; and
    in response to regenerating the first encryption key using the second secondary fragment and the first primary fragment, and authenticating the second user: grant access, by the second user, by unencrypting the first encrypted data record using the regenerated first encryption key.

3. The system of claim 1, further comprising a key management table, wherein the key management table comprises: a plurality of primary fragments and a plurality of corresponding encrypted data records.

4. The system of claim 1, wherein access to the first encrypted data record is prevented by permanently deleting the first primary fragment.

5. The system of claim 1, further comprising a key management table, wherein the key management table comprises at least one of:
    a first record, wherein the first record comprises plain text data; and
    a second record, wherein the second record comprises non-fragmented key encrypted data; and
    a third record, wherein the third record comprises the first encrypted data and the first primary fragment.

6. The system of claim 1, further comprising a key management table, wherein the key management table comprises:

a first row, wherein the first row comprises the first encrypted data record and the first primary fragment and wherein the first primary fragment is associated with the first encrypted data record, the first encryption key, and a first authentication level; and a second row, wherein the second row comprises a second encrypted data record and a second primary fragment, wherein the second primary fragment is associated with the second encrypted data record, a second encryption key, and a second authentication level.

7. The system of claim 6, wherein the first authentication level comprises a different number of authentication factors and/or one or more different types of authentication factors than the second authentication level and wherein a plurality of different users can access the first encrypted data record and the second encrypted data record based on the first authentication level and the second authentication level.

8. The system of claim 1, wherein the primary fragment comprises a plurality of fragments and wherein regenerating the first encryption key requires the primary fragment and a plurality of secondary fragments associated with a plurality different of users to unencrypt the first encrypted data record.

9. The system of claim 1, wherein the primary fragment is a secondary fragment and wherein regenerating the first encryption key requires a plurality of secondary fragments associated with a plurality different of users to unencrypt the first encrypted data record.

10. The system of claim 1, wherein the first primary fragment comprises a plurality of fragments, wherein the plurality of fragments of the first primary fragment are one less than the minimum number of fragments required to regenerate the first encryption key, and wherein at least one of a plurality of secondary fragments is permanently deleted or not provided to a user so that the first encryption key cannot be regenerated using remaining fragments of the plurality of secondary fragments.

11. A method, comprising:
receiving, by a microprocessor, a first secondary fragment of a first encryption key, wherein the first secondary fragment is associated with an authentication process of a first user and wherein the first secondary fragment is one of a plurality of secondary fragments of the first encryption key;
authenticating, by the microprocessor, the first user;
regenerating, by the microprocessor, the first encryption key using the first secondary fragment and a first primary fragment of the first encryption key;
in response to regenerating the first encryption key using the first secondary fragment and the first primary fragment, and authenticating the first user: granting, by the microprocessor, access, by the first user, by unencrypting a first encrypted data record using the regenerated first encryption key; and
revoking the first secondary fragment, wherein revoking the first secondary fragment comprises adding the first secondary fragment to a revoked fragment list associated with the first encryption key.

12. The method of claim 11, further comprising:
receiving a second secondary fragment of the first encryption key, wherein the second secondary fragment is associated with an authentication process of a second user and wherein the second secondary fragment is one of the plurality of secondary fragments of the first encryption key;
authenticating the second user;
regenerating the first encryption key using the second secondary fragment of the first encryption key and the first primary fragment of the first encryption key; and
in response to regenerating the first encryption key using the second secondary fragment and the first primary fragment, and authenticating the second user: granting access, by the second user, by unencrypting the first encrypted data record using the regenerated first encryption key.

13. The method of claim 11, further comprising a key management table, wherein the key management table comprises: a plurality of primary fragments and a plurality of corresponding encrypted data records.

14. The method of claim 11, wherein access to the first encrypted data record is prevented by permanently deleting the first primary fragment.

15. The method of claim 11, further comprising a key management table, wherein the key management table comprises at least one of:
a first record, wherein the first record comprises plain text data; and
a second record, wherein the second record comprises non-fragmented key encrypted data; and
a third record, wherein the third record comprises the first encrypted data and the first primary fragment.

16. The method of claim 11, further comprising a key management table, wherein the key management table comprises:
a first row, wherein the first row comprises the first encrypted data record and the first primary fragment and wherein the first primary fragment is associated with the first encrypted data record, the first encryption key, and a first authentication level; and
a second row, wherein the second row comprises a second encrypted data record and a second primary fragment, wherein the second primary fragment is associated with the second encrypted data record, a second encryption key, and a second authentication level.

17. The method of claim 16, wherein the first authentication level comprises a different number of authentication factors and/or one or more different types of authentication factors than the second authentication level and wherein a plurality of different users can access the first encrypted data record and the second encrypted data record based on the first authentication level and the second authentication level.

18. A key management table stored in a memory, comprising:
a first row, wherein the first row comprises a first encrypted data record and a first primary fragment and wherein the first primary fragment is associated with the first encrypted data record, a first encryption key, and a first authentication level; and
a second row, wherein the second row comprises a second encrypted data record and a second primary fragment, wherein the second primary fragment is associated with the second encrypted data record, a second encryption key, and a second authentication level,
wherein each of the first primary fragment and the second primary fragment is generated based on a split-key encryption process,
wherein the first encryption key to unencrypt the first encrypted data record is generated from the first primary fragment and a first secondary fragment,
wherein the second encryption key to unencrypt the second encrypted data record is generated from the second primary fragment and a second secondary fragment, wherein unencrypting the first encrypted data record is based on providing the first secondary fragment in response to a first user authentication associated with the first secondary fragment, and wherein unencrypting the second encrypted data record is based on providing the second secondary fragment in response to a second user authentication associated with the second secondary fragment.

19. The key management table of claim 18, wherein access to the first encrypted data record is prevented by permanently deleting the first primary fragment.

20. The key management table of claim 18, wherein the first authentication level comprises a different number of authentication factors and/or one or more different types of authentication factors than the second authentication level and wherein a plurality of different users can access the first encrypted data record, and the second encrypted data record based on the first authentication level and the second authentication level.

* * * * *